(12) United States Patent
Kwon et al.

(10) Patent No.: US 8,435,662 B2
(45) Date of Patent: May 7, 2013

(54) COUPLING SOCKET FOR CABLE-TYPE SECONDARY BATTERY AND COUPLING ASSEMBLY HAVING THE SAME

(75) Inventors: Yo-Han Kwon, Daejeon (KR); Je-Young Kim, Daejeon (KR); Byung-Hun Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/340,065

(22) Filed: Dec. 29, 2011

(65) Prior Publication Data

US 2012/0121957 A1    May 17, 2012

Related U.S. Application Data (63) Continuation of application No. PCT/KR2011/006577, filed on Sep. 6, 2011.

(30) Foreign Application Priority Data

Nov. 12, 2010    (KR) .......................... 10-2010-0112407

(51) Int. Cl.
*H01M 2/20* (2006.01)
(52) U.S. Cl.
USPC .......................................... 429/99

(58) Field of Classification Search ........................ None
See application file for complete search history.

(56) References Cited

U.S. PATENT DOCUMENTS

2008/0248378 A1 * 10/2008 Mcguire ......................... 429/99

FOREIGN PATENT DOCUMENTS

| JP | 08-088019 A | 4/1996 |
|---|---|---|
| JP | 09-007629 A | 1/1997 |
| KR | 10-2007-0014658 A | 2/2007 |
| KR | 10-0804411 B1 | 2/2008 |
| KR | 20-2008-0001108 U | 5/2008 |
| WO | WO 2005098994 A1 * | 10/2005 |

* cited by examiner

*Primary Examiner* — Patrick Ryan
*Assistant Examiner* — Wyatt McConnell
(74) *Attorney, Agent, or Firm* — Birch, Stewart, Kolasch & Birch, LLP (57) ABSTRACT

A coupling socket of a cable-type secondary battery includes a first connection unit capable of being electrically connected to a terminal of a first polarity electrode of a cable-type secondary battery, a second connection unit capable of being electrically connected to a terminal of a second polarity electrode of another cable-type secondary battery, and a body electrically connected to the first connection unit and the second connection unit, wherein at least one of the first connection unit and the second connection unit is pivotal.

13 Claims, 8 Drawing Sheets

COUPLING SOCKET FOR CABLE-TYPE SECONDARY BATTERY AND COUPLING ASSEMBLY HAVING THE SAME

CROSS-REFERENCE TO RELATED APPLICATION

This application is a continuation of International Application No. PCT/KR2011/006577 filed on Sep. 6, 2011, which claims priority under 35 USC 119(a) to Korean Patent Application No. 10-2010-0112407 filed in the Republic of Korea on Nov. 12, 2010, the entire contents of which are incorporated herein by reference.

TECHNICAL FIELD

The present disclosure relates to a coupling socket of a cable-type secondary battery and a coupling assembly having the same, and more particularly, to a coupling socket of a cable-type secondary battery useable for connecting a plurality of elongated cable-type secondary batteries in series with each other and a coupling assembly having the same.

BACKGROUND ART

Recently, advances in wireless communication technologies have led to the popularization of mobile devices, and with this development there is a strong tendency for devices to use secondary batteries as a power source. Meanwhile, electric vehicles and hybrid vehicles are being developed to prevent environmental pollutions, and such vehicles also use secondary batteries as a power source.

Secondary batteries are being frequently used in various industrial fields as described above, and such secondary batteries have various outputs, capacities and structures according to their applications.

Generally, a secondary battery includes an electrode assembly having a cathode and an anode, which are formed by applying active material on the surface of current collectors, and a separator interposed between the cathode and the anode. The electrode assembly is generally received in a cylindrical or rectangular can or a pouch-type case made of an aluminum laminate sheet together with liquid or solid electrolyte. In addition, the electrode assembly may include a plurality of subsequently laminated unit electrodes, each having a thin-plate shape or a jelly-roll shape where a cathode, a separator and an anode in sheet shapes are rolled to increase the capacity of a secondary battery. Therefore, in the electrode assembly, the electrode intrinsically has a plate shape.

Such a conventional plate-shape electrode structure may be advantageous in that it may realize a high degree of integration when the electrode assembly is rolled or laminated, but there is a limit to the extent the structure can deform according to the demand of the industrial field. In addition, the plate-type electrode structure has various problems in that it is sensitive to the change in volume of the electrode during the charging/discharging process, the gas generated in the cell may not easily discharge to the outside, and the potential difference between the electrodes may increase.

In particular, to meet the various demands of the consumers, the kinds of devices using secondary batteries are diversifying and a great amount of emphasis is being put on the designs of devices. Despite this, there still remains a concept or scheme of sparing a separate portion or space in devices having unique designs in order to mount a secondary battery having a traditional structure and/or shape (e.g., cylindrical, rectangular or pouch shape) to such devices, and such a concept or scheme is considered to be a great obstacle when expanding the wireless technology and developing new designs. For example, in the case where a newly designed device is limited to only a narrow and long portion to mount a secondary battery, it is intrinsically impossible or impractical to mount a conventional secondary battery having plate-type electrodes. In other words, since the conventional cylindrical, coin-type and rectangular batteries have specific shapes, the batteries are limited in its use and ability to freely deform. In other words, since the conventional secondary batteries may not freely deform, it is impossible to twist or bend the secondary batteries in accordance with the size and/or shape of a battery mounting portion of a device.

In order to solve these problems, the applicant of this application has suggested 'an electrode assembly with a new structure and a secondary battery having the same', which was filed on Jan. 17, 2006 in the Republic of Korea and allowed as a patent with Korean Patent Registration No. 10-1804411, the entire contents of which are incorporated herein by reference.

The secondary battery disclosed in the above patent registration has an elongated shape, in other words a cable structure flexible in a length direction (hereinafter, this secondary battery will be referred to as a 'cable-type secondary battery'). If a single cable-type secondary battery is mounted to a device, there is no special problem. However, in the case where a plurality of cable-type secondary batteries are used, for example when it is necessary to connect a plurality of cable-type secondary batteries in series and mount them to a device, a socket for connecting the two cable-type secondary batteries is required. Therefore, there is an urgent demand for the development of such a socket.

DISCLOSURE

Technical Problem

The present disclosure is designed to solve the problems of the prior art, and therefore the present disclosure is directed to providing a coupling socket of a cable-type secondary battery configured to conveniently connect two neighboring cable-type secondary batteries in series without a separate complicated coupling adaptor, and a coupling assembly having the same.

Technical Solution

In one aspect of the present disclosure, there is provided a coupling socket of a cable-type secondary battery, which includes a first connection unit capable of being electrically connected to a terminal of a first polarity electrode of a cable-type secondary battery; a second connection unit capable of being electrically connected to a terminal of a second polarity electrode of another cable-type secondary battery; and a body electrically connected to the first connection unit and the second connection unit, wherein at least one of the first connection unit and the second connection unit is pivotal.

Preferably, any one of the first connection unit and the second connection unit further includes a fixing member for fixing a terminal of the first polarity electrode or a terminal of the second polarity electrode correspondingly.

Preferably, the fixing member has a hook installed to at least one of the first connection unit and the second connection unit.

Preferably, the first polarity electrode is any one of a cathode and an anode, and the second polarity electrode is the other of the cathode and the anode.

Preferably, the cable-type secondary battery has an elongated electrode assembly which includes a first polarity electrode, a second polarity electrode, and a separator or electrolyte interposed between the first and second polarity electrodes, and the first polarity electrode and/or the second polarity electrode is configured by applying electrode active material to the surface of a current collector whose section orthogonal to the length direction has a circular shape, an asymmetric oval shape or a polygonal shape.

Preferably, the cable-type secondary battery includes at least two unit cable-type secondary batteries disposed side by side, and an insulative member having a terminal of the first polarity electrode at one end and a terminal of the second polarity electrode at the other end.

In another aspect of the present disclosure, there is also provided a coupling assembly of a cable-type secondary battery, which includes a first socket having a first connection fixing unit electrically connectable to a first polarity terminal of a cable-type secondary battery and a pivotal connection unit pivotal with respect to the first connection fixing unit; and a second socket electrically connectable to a second polarity terminal of the cable-type secondary battery and electrically connectable to a pivotal connection unit connected to a first polarity terminal of another cable-type secondary battery.

Preferably, the first socket further includes a body on which at least one of the first connection fixing unit and the pivotal connection unit is pivotal.

Preferably, at least one of the pivotal connection unit and the second socket further includes a fixing member for fixing a fixed state between the pivotal connection unit and the second socket.

Preferably, the cable-type secondary battery has an elongated electrode assembly which includes a cathode, an anode and a separator interposed between the cathode and the anode, and the first polarity electrode and/or the second polarity electrode is configured by applying electrode active material to the surface of a current collector whose section orthogonal to the length direction has a circular shape, an asymmetric oval shape or a polygonal shape.

Preferably, the pivotal connection unit of the first socket has a protrusion, and the second socket has an insert portion into which the corresponding protrusion is capable of being inserted.

Advantageous Effects

The coupling socket of a cable-type secondary battery and the coupling assembly having the same give the following effects.

First, when two or more cable-type secondary batteries are connected in series, two neighboring cable-type secondary batteries may be coupled in an easy and convenient way by using the coupling socket or the coupling assembly (having a male socket and a female socket) even without using a complicated coupling adaptor.

Second, when two or more cable-type secondary batteries are connected in series, a voltage and electric capacity required for the cable-type secondary batteries may be easily maintained by using the coupling socket or the coupling assembly.

Third, if the coupling socket of a cable-type secondary battery according to the present disclosure or the coupling assembly having the same is used, the secondary battery may be modified in various ways to freely form into shapes such as a necklace-type PDA or a necklace string of a cellular phone, so that a user may supply power source from the necklace-shaped secondary battery without having to mount a separate secondary battery.

DESCRIPTION OF DRAWINGS

Other objects and aspects of the present disclosure will become apparent from the following descriptions of the embodiments with reference to the accompanying drawings. The drawings illustrate a fluid supplying apparatus and a thin film cleaning system and method according to exemplary embodiments. However, it should be understood that the disclosure is not limited to components or means depicted in the drawings. In the drawings.

BEST MODE

Terms used in the following detailed description are for convenience and not for limiting the disclosure. Terms such as "right", "left", "top surface", and "bottom surface" represent a respective direction in the drawing that it refers to. Terms such as "inward" and "outward" respectively represent a direction oriented to or departing from a geometric center of a respective designated apparatus, system, or member. Terms such as "front", "rear", "upper", "lower" and its relevant words or phrases represent locations and orientations in the drawing that it refers to, and they are not intended to limit the disclosure. These terms include words listed above, their derivatives and their synonyms.

Exemplary embodiments will be described with reference to the accompanying drawings.

Figure 1:
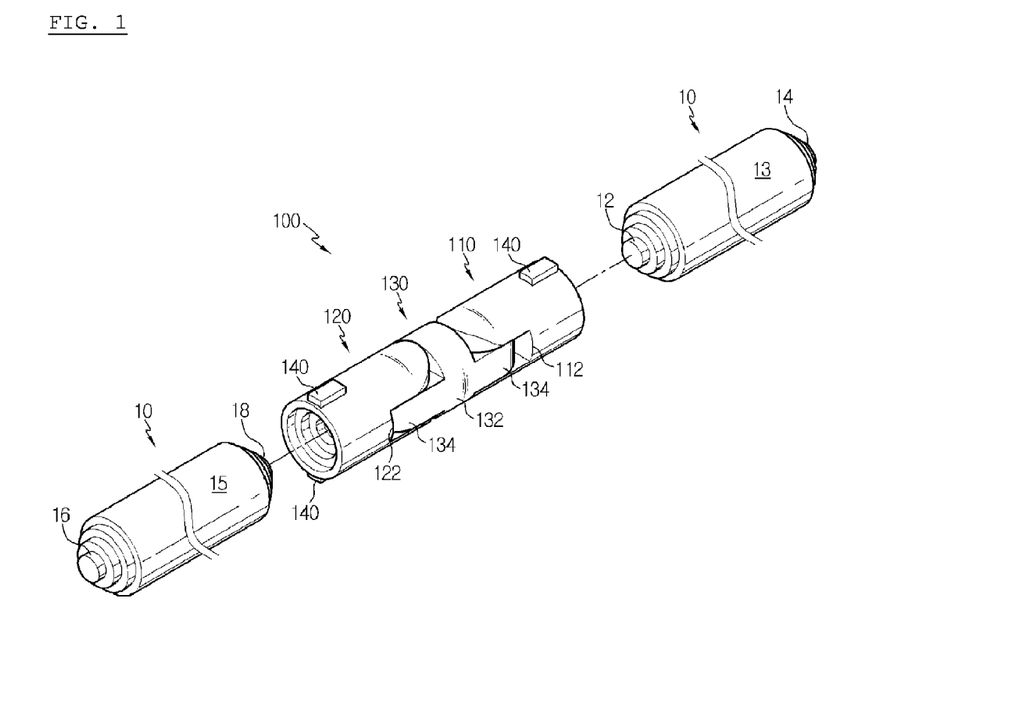
FIG. 1 is a schematic perspective view showing essential parts of a coupling socket of a cable-type secondary battery according to a preferred embodiment of the present disclosure.
Figure 2:
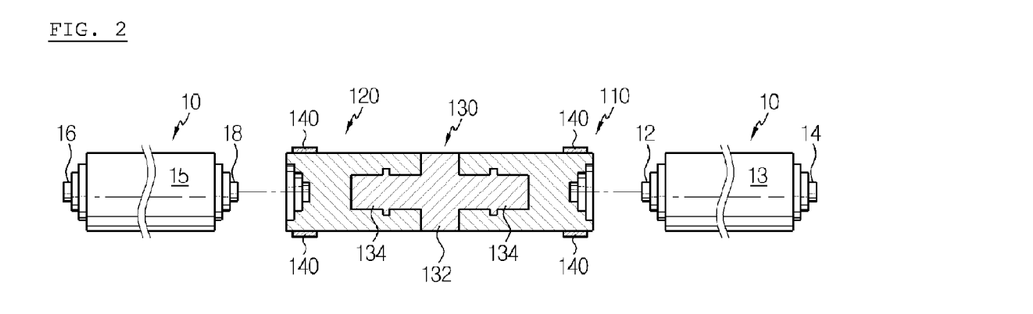
FIG. 2 is a cross-sectional view of FIG. 1.

FIG. 1 is a schematic perspective view showing essential parts of a coupling socket of a cable-type secondary battery according to a preferred embodiment of the present disclosure, and FIG. 2 is a cross-sectional view of FIG. 1.

Referring to FIGS. 1 and 2, a coupling socket of a cable-type secondary battery 100 is used for interconnecting neighboring cable-type secondary batteries 10 when a plurality of cable-type secondary batteries 10 are connected in series, and includes a first connection unit 110, a second connection unit 120 and a body 130.

The first connection unit 110 has a distal end and a proximal end opposite thereto. The distal end of the first connection unit 110 has a concave groove in the length direction by a predetermined depth to engage with the end portion of a terminal 12 of a first polarity electrode so that the first connection unit 110 may be selectively connected to the terminal 12 of the first polarity electrode of a first cable-type secondary battery 13 which has the terminal 12 of the first polarity electrode and a terminal 14 of a second polarity electrode. The proximal end of the first connection unit 110 is connected to one end of the body 130 to be pivotal or fixed thereat.

The second connection unit 120 also has a distal end and a proximal end opposite thereto. The distal end of the second connection unit 120 has a concave groove in the length direction so that the second connection unit 120 may be selectively connected to a terminal 18 of a second polarity electrode of a second cable-type secondary battery 15 which has a terminal 16 of a first polarity electrode and the terminal 18 of the second polarity electrode and may engage with the end portion of the terminal 18 of the second polarity electrode. The proximal end of the second connection unit 120 is connected to the body 130 to be pivotal or fixed thereat.

The body 130 is connected to the proximal ends of the first connection unit 110 and the second connection unit 120, and both the first connection unit 110 and the second connection unit 120 are configured to pivot with respect to the body 130. As an alternative, however, it is also possible that either the first connection unit 110 or the second connection unit 120 is configured to pivot with respect to the body 130.

In a preferred embodiment, the body 130 includes a pivotal shaft 132 formed at the center thereof, and a pair of protrusions 134 provided to be symmetric to the pivotal shaft 132. Here, the pivotal shaft 132 represents a reference point on which the first connection unit 110 and the second connection unit 120 may pivot with respect to the body 130. Therefore, the proximal ends of the first connection unit 110 and the second connection unit 120 respectively have lead-in portions 112 and 122 in which the protrusions 134 of the body 130 may be received. Meanwhile, it could be understood that the body 130 and the first and second connection units 110 and 120 may be electrically connected to each other by wires, not shown, or by connection units formed between them, which allows selective connection.

The section of the first and second connection units 110 and 120 are configured to be substantially similar to the section of the cable-type secondary batteries 10 respectively connected thereto. For example, since cable-type secondary batteries 10 to be connected may substantially have a polygonal section such as a circular, oval, rectangular or hexagonal shape, the cable-type secondary batteries 10 are preferably configured to have substantially the same section as the section of the first and second connection units 110 and 120.

The first connection unit 110 and the second connection unit 120 may include a fixing member 140, respectively. After the terminal 12 of the first polarity electrode and the terminal 18 of the second polarity electrode of the corresponding first cable-type secondary battery 13 are respectively inserted into the grooves of the first connection unit 110 and the second connection unit 120 of the second cable-type secondary battery 15, the fixing member 140 may selectively fix the locations of the terminal 12 of the first polarity electrode and the terminal 18 of the second polarity electrode. In the case where the terminal 12 of the first polarity electrode of the first cable-type secondary battery 13 or the terminal 18 of the second cable-type secondary battery 15 are coupled to each groove of the first connection unit 110 or the second connection unit 120, the fixing member 140 prevents the terminals 12 and 18 of each cable-type secondary battery 10 from separating from the corresponding connection units 110 and 120, and, if necessary, facilitates easy separation of the terminals 12 and 18. For this purpose, the fixing member 140 has a hook movably installed at both side surfaces of the first connection unit 110 and the second connection unit 120. The hook is pushed by a spring, not shown, or the like when the terminals 12 and 18 are inserted into the connection units 110 and 120 so that terminals 12 and 18 are fixed at regular positions of the connection units 110 and 120 and the terminals 12 and 18 may deviate from the connection units 110 and 120 by a pressing force of a user, as being easily understood by those having ordinary skill in the art. In addition, it could be easily understood that the fixing member 140 may include other fixing elements already known in the art or to be known later, such as a latch, a fastener, a fixture, a fixing button, a rotating screw, a radial ring or the like, in addition to the above hook structure.

In the above embodiment, each cable-type secondary battery 10 includes an elongated electrode assembly including a first polarity electrode, a second polarity electrode, and a separator interposed between the first and second polarity electrodes, and the first polarity electrode and/or second polarity electrode is fabricated by applying electrode active material on the surface of a current collector whose section orthogonal to the length direction has a circular, asymmetric oval or polygonal shape. The first polarity electrode is any one of a cathode and an anode, and the second polarity electrode is the other of the cathode and the anode. The electrode assembly is disclosed in Korean Patent Registration No. 10-1804411, entitled "an electrode assembly with a new structure and a secondary battery having the same" and filed on Jan. 17, 2006 in the Republic of Korea and allowed as a patent with, the entire contents of which are incorporated herein by reference.

Figure 3:
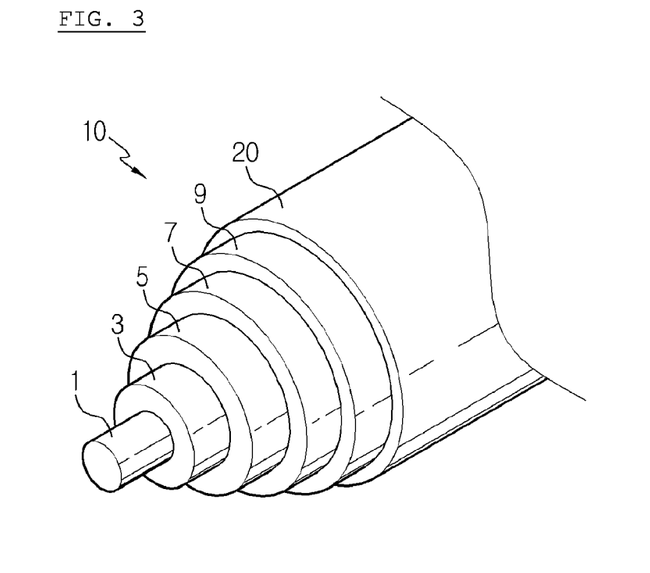
FIG. 3 is a partial perspective view showing essential parts of a cable-type secondary battery according to a preferred embodiment of the present disclosure.
Figure 4:
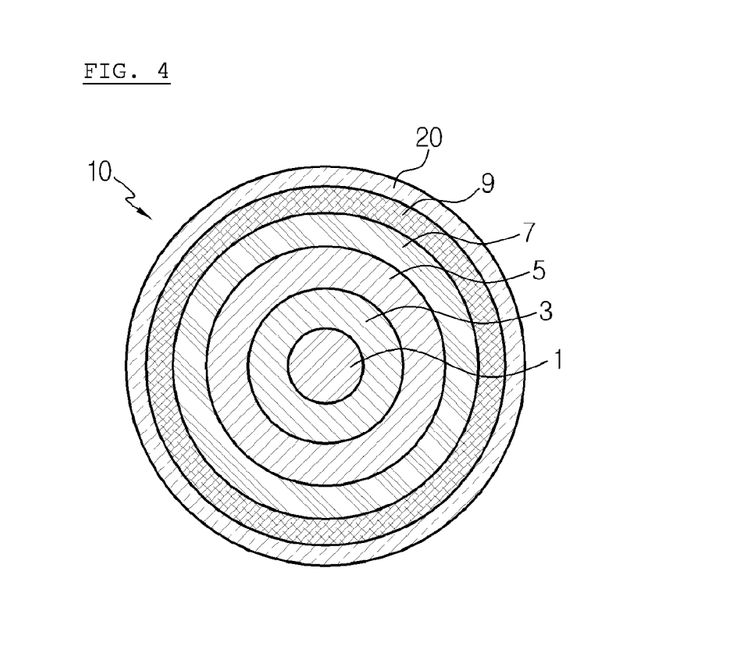
FIG. 4 is a sectional view of FIG. 3.

FIG. 3 is a partial perspective view showing essential parts of a cable-type secondary battery according to a preferred embodiment of the present disclosure, and FIG. 4 is a sectional view of FIG. 3. In FIGS. 3 and 4, the same reference numeral as in FIGS. 1 and 2 designates the same component having the same function.

Referring to FIGS. 3 and 4, the cable-type secondary battery 10 having a single strip shape according to the preferred embodiment of the present disclosure is configured so that a protective coating 20 surrounds the outer surface of an electrode assembly which includes an anode active material 3 provided at the surface of a 3-dimensional anode current collector 1 having an elongated wire shape with a circular section, a separating element 5 containing a separator or electrolyte and provided at the outer surface of the anode active material 3, a cathode active material 7 formed at the outer surface of the separating element 5, and a cathode current collector 9 formed at the outer surface of the cathode active material 7, differently from a conventional plate-type electrode assembly configured by applying electrode active material on the surface of a 2-dimensional current collector such as a metal foil. Here, the cathode and the anode may be installed in a reverse order. In other words, the cathode current collector with an elongated wire shape is provided at the central inside, and then the cathode active material, the separating element, the anode active material, and the anode current collector may be configured on the outer surface of the cathode current collector in order, as being understood by those having ordinary skill in the art.

Meanwhile, the circular structure of the current collector includes not only a geometrically perfect symmetric circular shape but also an asymmetric oval structure. The polygonal structure includes a triangular shape, a rectangular shape, a pentagonal shape, a hexagonal shape or the like without being specially limited, unless it is a 2-dimensional plate shape, and their edges may be angled or rounded. The electrode active material is applied to the surface of the current collector with a circular or polygonal structure and plays a role of transferring electrons by intercalating ions from the electrolyte and deintercalating ions to the electrolyte as in the conventional secondary battery.

In an alternative embodiment, a so-called multi-strip cable-type secondary battery may include an electrolyte layer having a cylindrical shape and formed around a bundle of a plurality of unit anodes fabricated by applying anode active material on the surface of an elongated anode current collector, cathode active material provided on the outer circumference of the electrolyte layer, a cathode current collector formed on the outer circumference of the cathode active material, and a protective coating formed on the outer circumference of the cathode current collector. In addition, another modified example of the multi-strip cable-type secondary battery may include a bundle of assemblies having an electrolyte layer on the outer circumference of a unit anode, a cylindrical cathode active material provided around the bundle of assemblies, a cathode current collector formed on the outer circumference of the cathode active material, and a protective coating formed thereon. Still another modified example of the multi-strip cable-type secondary battery may include a bundle of a plurality of unit cathodes and a plurality of unit anodes, configured so that a first electrolyte layer surrounds any one of a unit anode and a unit cathode, fabricated by applying corresponding active material to the outer circumference of each wire-shaped current collector; a cylindrical second electrolyte layer surrounding the bundle; and a protective coating surrounding the second electrolyte layer.

Figure 5:
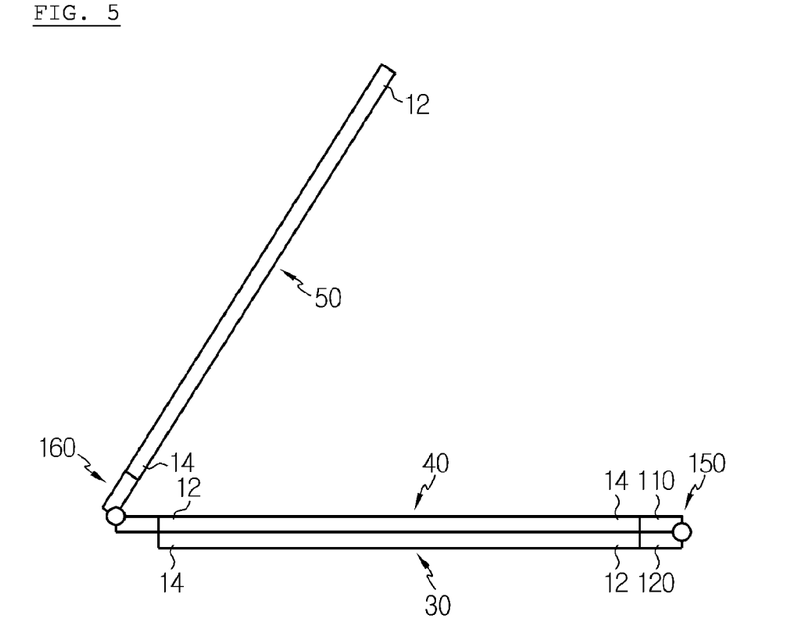
FIG. 5 is a schematic view showing that a plurality of cable-type secondary batteries are connected by means of sockets shown in FIGS. 1 and 2.

FIG. 5 is a schematic view showing that a plurality of cable-type secondary batteries are connected by means of coupling sockets shown in FIGS. 1 and 2. In FIG. 5, the same reference numeral as in FIGS. 1 to 4 designates the same component with the same function.

Referring to FIG. 5, three cable-type secondary batteries 30, 40 and 50 may be connected in series by means of two coupling sockets 150 and 160. In other words, the terminal 12 of the first polarity electrode of the first cable-type secondary battery 30 is connected to the second connection unit 120 of the first socket 150, and the terminal 14 of the second polarity electrode of the first cable-type secondary battery 30 does not have another connection structure. The terminal 12 of the first polarity electrode of the second cable-type secondary battery 40 is connected to the second connection unit 120 of the second socket 160, and the terminal 14 of the second polarity electrode of the second cable-type secondary battery 40 is connected to the first connection unit 110 of the first socket 150. The terminal 14 of the second polarity electrode of the third cable-type secondary battery 50 is connected to the first connection unit 110 of the second socket 160, and the terminal 12 of the first polarity electrode of the third cable-type secondary battery 50 does not have another connection structure.

As described above, by providing coupling sockets 100 by one less than the number of cable-type secondary batteries 10 connected in series, secondary batteries may expand as desired in the length direction.

Figure 6:
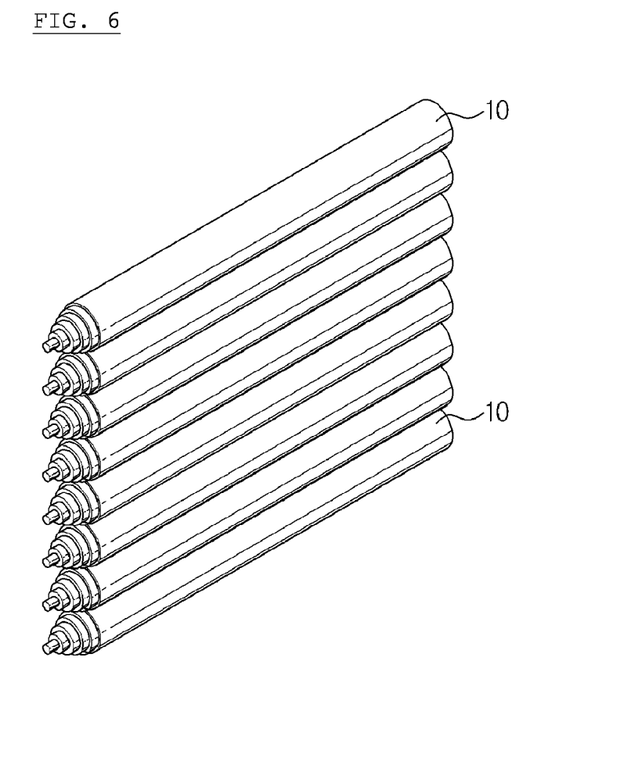
FIGS. 6 to 8 are schematic views for illustrating a process of manufacturing a cable-type secondary battery packaged in a sheet shape according to another embodiment of the present disclosure.
Figure 7:
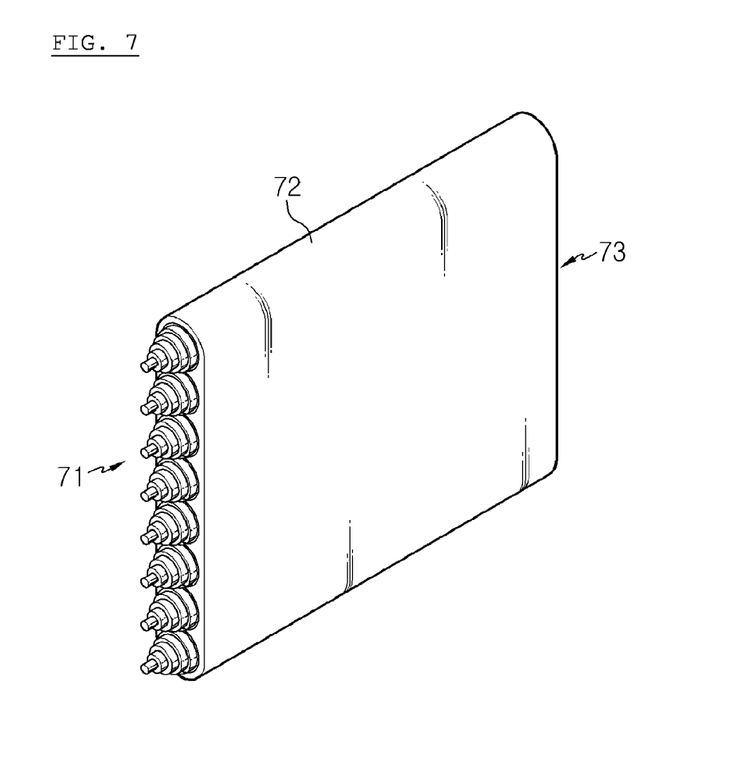
Figure 8:
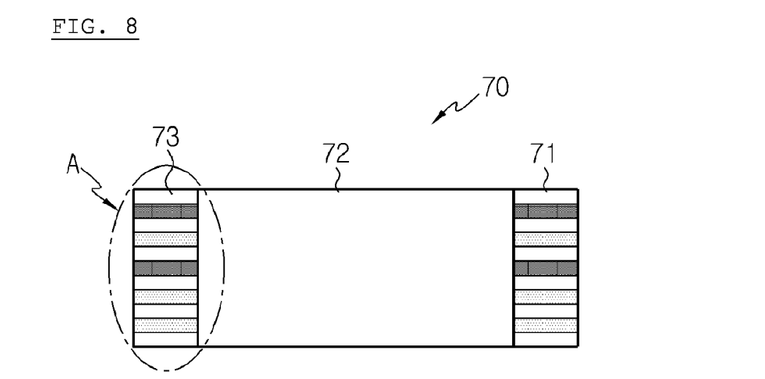
Figure 9:
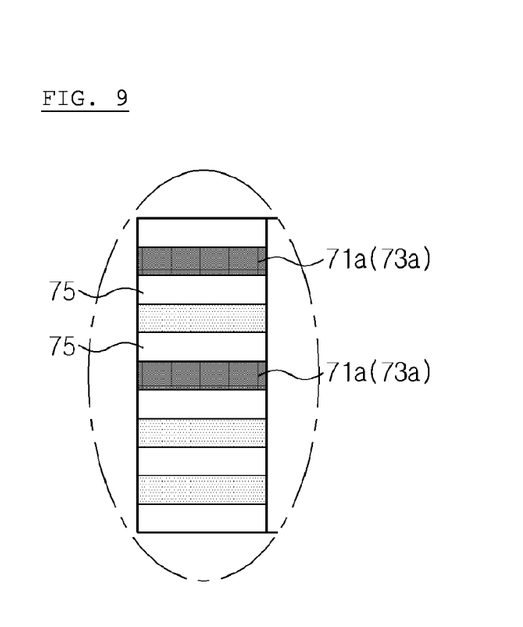
FIG. 9 is an enlarged view showing the "A" portion of FIG. 8.

FIGS. 6 to 8 are schematic views for illustrating a process of manufacturing a cable-type secondary battery packaged in a sheet shape according to another embodiment of the present disclosure. FIG. 9 is an enlarged view showing the "A" portion of FIG. 8. In FIGS. 6 to 9, the same reference numeral as in FIGS. 1 to 5 designates the same component with the same function.

Referring to FIGS. 6 to 9, the cable-type secondary battery 70 (see FIG. 8) according to the present disclosure has a so-called sheet-shaped structure. In a state where a plurality of unit cable-type secondary batteries 10 are arranged side by side, an insulative member 72 with an insulative film shape is mounted to surround the outer surface of the unit cable-type secondary batteries 10 arranged side by side. In addition, a first polarity terminal 71 and a second polarity terminal 73 are respectively provided at both ends of the sheet-shaped cable-type secondary battery 70. Metal taps 71a and 73a of the terminals 71 and 73 are insulated from each other by a polymer-based insulative film 75, as shown in FIG. 9.

Figure 10:
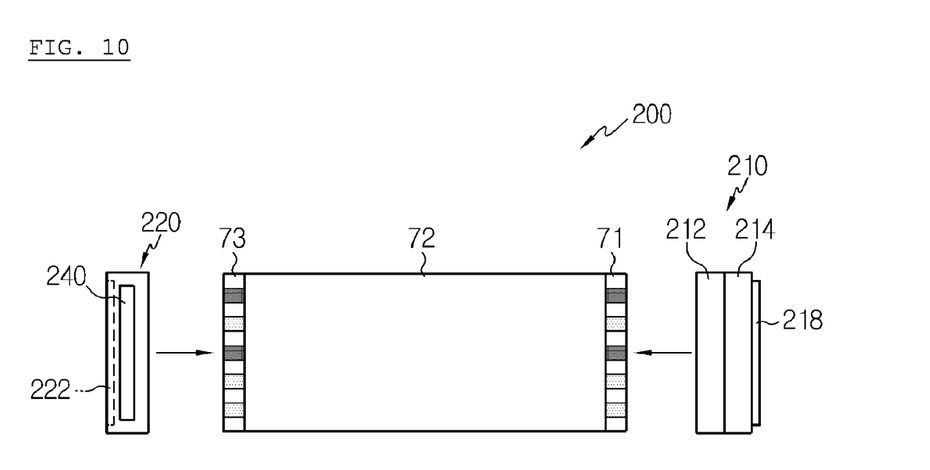
FIG. 10 is a schematic view showing a coupling assembly of a cable-type secondary battery according to another embodiment of the present disclosure.
Figure 11A:
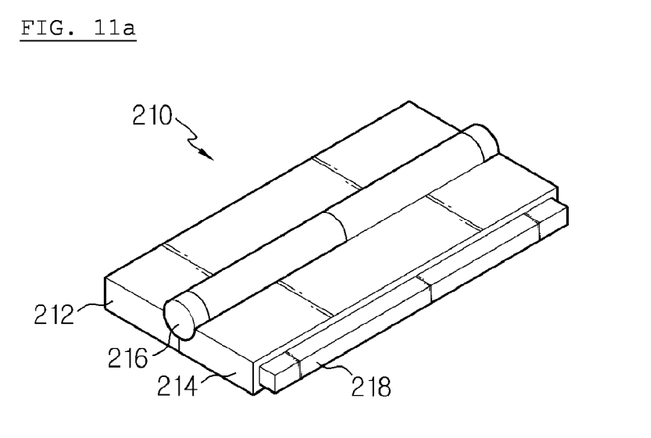
FIGS. 11a to 11c are perspective views showing a first socket of the coupling assembly shown in FIG. 10.
Figure 11B:
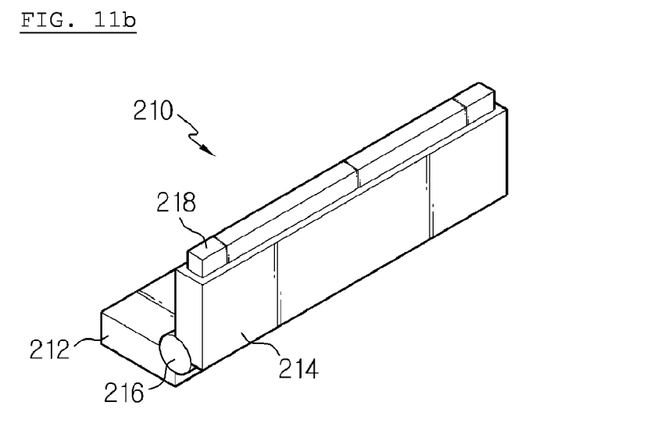
Figure 11C:
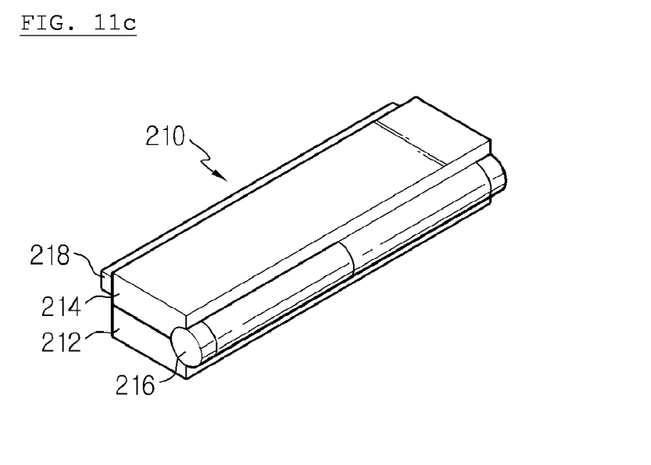
Figure 12:
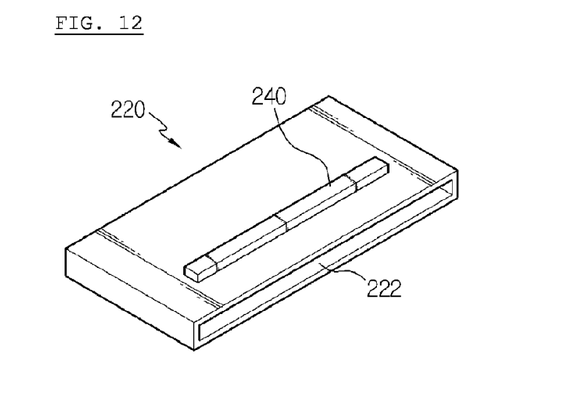
FIG. 12 is a perspective view showing a second socket of the coupling assembly shown in FIG. 10.
Figure 13:
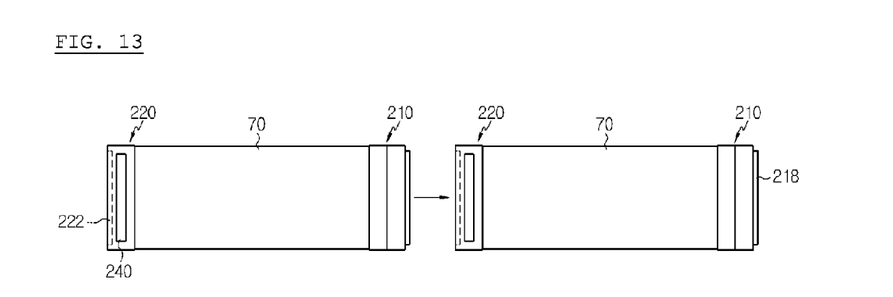
FIG. 13 is an exploded view showing cable-type secondary batteries whose coupling assemblies as shown in FIG. 10 are not coupled.
Figure 14:
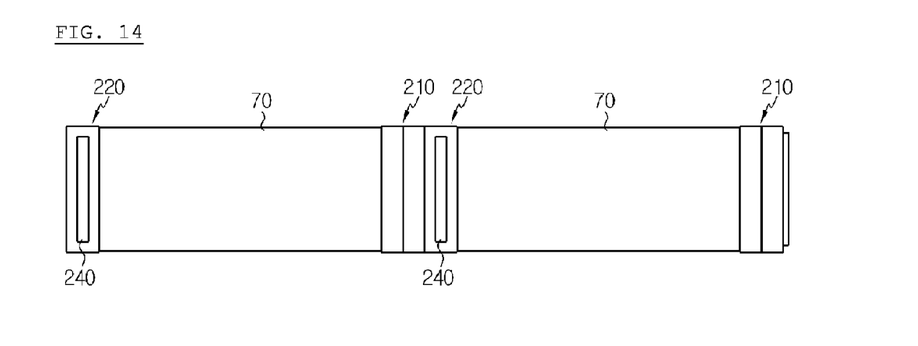
FIG. 14 shows that the coupling assemblies of the cable-type secondary batteries of FIG. 13 are coupled.

FIG. 10 is a schematic view showing a coupling assembly of a cable-type secondary battery according to another embodiment of the present disclosure, FIGS. 11a to 11c are perspective views showing a first socket of the coupling assembly shown in FIG. 10, FIG. 12 is a perspective view showing a second socket of the coupling assembly shown in FIG. 10, FIG. 13 is an exploded view showing cable-type secondary batteries whose coupling assemblies as shown in FIG. 10 are not coupled, and FIG. 14 shows that the coupling assemblies of the cable-type secondary batteries of FIG. 13 are coupled. In FIGS. 10 to 14, the same reference numeral as in FIGS. 1 to 9 designates the same component with the same function.

Referring to FIGS. 10 to 14, a coupling assembly 200 according to this embodiment is used for connecting in series a plurality of sheet-shaped cable-type secondary batteries 70, each having a plurality of unit cable-type secondary batteries 10 packaged therein. In addition, the coupling assembly 200 of this embodiment includes a first socket 210 and a second socket 220. One end of the first socket 210 is connected and fixed to a first polarity terminal 71 of the sheet-shaped cable-type secondary battery 70, and one end of the second socket 220 is connected and fixed to a second polarity terminal 73 of the sheet-shaped cable-type secondary battery 70. In the state where the first polarity terminal 71 and the second polarity terminal 73 of the sheet-shaped cable-type secondary battery 70 are respectively connected and fixed to the first socket 210 and the second socket 220, any one first socket 210 may be coupled to the other second socket 220.

The first socket 210 includes a first connection fixing unit 212 which may be electrically connected to the first polarity terminal 71, for example a cathode terminal, of the sheet-shaped cable-type secondary battery 70; a pivotal connection unit 214 which is pivotal with respect to the first connection fixing unit 212; and a body 216 for pivotally connecting the first connection fixing unit 212 and the pivotal connection unit 214. In other words, the first socket 210 is configured so that at least one of the first connection fixing unit 212 and the pivotal connection unit 214 may pivot with respect to the body 216. In addition, the first connection fixing unit 212 and the pivotal connection unit 214 are electrically connected to the body 216, respectively. The pivotal connection unit 214 has a protrusion 218 which may be inserted into an insert portion 222 of the second socket 220 connected to another secondary battery 70.

As described above, one end of the second socket 220 is electrically connected and fixed to the second polarity terminal 73, for example an anode, of the sheet-shaped cable-type secondary battery 70, and the other end of the second socket 220 has the insert portion 222 into which the protrusion 218 of the pivotal connection unit 214 of the first socket 210 connected to another secondary battery 70 may be inserted. In other words, since the protrusion 218 of the first socket 210 and the insert portion 222 of the second socket 220 are required for connecting or separating two secondary batteries 70 to/from each other, the protrusion 218 and the insert portion 222 are preferably configured to be selectively connected or separated to/from each other so as to maintain its connection state not to be released in use. The connection used herein has an inclusive concept including electric connection.

According to this embodiment, in order to facilitate connection/releasing between the protrusion 218 and the insert portion 222, a fixing member 240 may be provided to any one of the first socket 210 and the second socket 220. FIG. 12 shows that the fixing member 240 is provided at the second socket 220. In other words, the fixing member 240 provided at the second socket 220 is used for selectively fixing or releasing the location of the protrusion 228 of a corresponding first socket 210 inserted into the insert portion 222 of the second socket 220.

Figure 15:
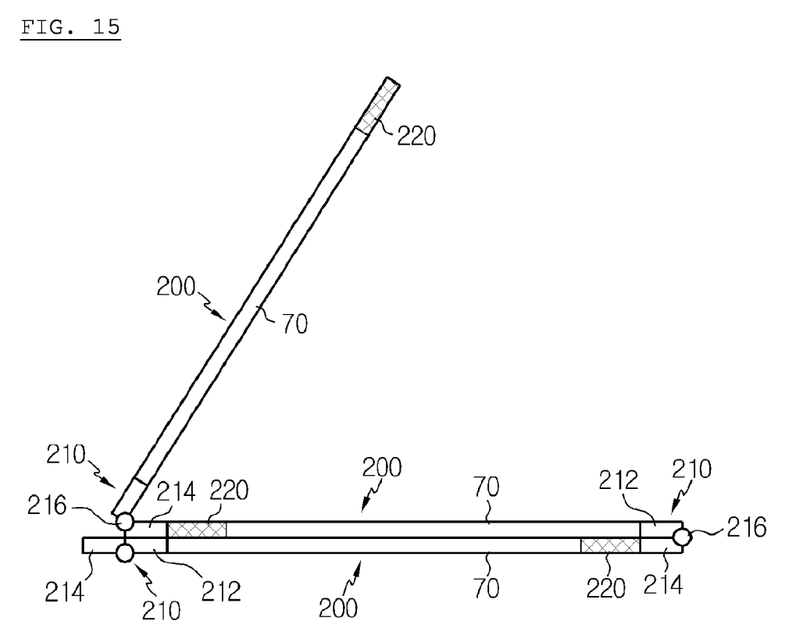
FIG. 15 is a schematic view for illustrating the process of folding sheet-type cable-type secondary batteries connected in the manner shown in FIG. 14.

FIG. 15 is a schematic view for illustrating the process of folding sheet-type cable-type secondary batteries connected in the manner shown in FIG. 14.

Referring to FIGS. 14 and 15, the first socket 210 is connected to the first polarity terminal 71, for example the anode, of each sheet-shaped cable-type secondary battery 70, and the second socket 220 is connected to the second polarity terminal 73, for example the anode. In addition, the first socket 210 of any one coupling assembly is connected to the second socket 220 of another coupling assembly 200. In this state, as shown in FIG. 15, in the first socket 210 connected to any one sheet-shaped cable-type secondary battery 70, the pivotal connection unit 214 may pivot by a designed angle with respect to the first connection fixing unit 212.

The above description and accompanying drawings illustrate preferred embodiments of the present invention, and it should be understood that various additions, modifications, combinations and/or substitutes can be made without departing from the spirit and scope of the invention, as defined in the appended claims. In particular, it would be understood by those of ordinary skill in the art that the present invention may be implemented with different specific shapes, structures, arrangements, or ratios by using other elements, materials, and components within the scope of the invention. It would also be understood by those of ordinary skill in the art that the present invention can be used with many modifications of structures, arrangements, ratios, materials, and components to be particularly suitable for specific environments or operation conditions within the principle of the invention. Also, the features described in the specification can be used solely or in combination with other features. For example, any features described in relation with one embodiment may be used together with and/or as a substitute for other features described in another embodiment. Thus, the disclosed embodiments should be construed not to limit the invention but to illustrate the invention in all aspects, and the scope of the invention is defined in the appended claims and not limited by the detailed description.

Any person having ordinary skill in the art would understand that various changes and modifications can be made to the invention within the scope of the invention. Some of these changes and modifications have already been discussed above, and other changes will be apparent to those of ordinary skill in the art.

| Reference Symbols | |
|---|---|
| 10, 13, 15, 30, 40, 50: cable-type secondary battery | |
| 70: sheet-shaped cable-type secondary battery | |
| 1: anode current collector | 3: anode active material |
| 5: separating element | 7: cathode active material |
| 9: cathode current collector | |
| 12, 16: terminal of the first polarity electrode | |
| 14, 18: terminal of the second polarity electrode | |
| 20: protective coating | 71: first polarity terminal |
| 72: insulative member | 73: second polarity terminal |
| 110: first connection unit | 112, 122: lead-in portion |
| 120: second connection unit | 130: body |
| 132: pivotal shaft | 134: protrusion |
| 200: coupling assembly | 210: first socket |
| 220: second socket | |

What is claimed is:

1. A coupling socket of a cable-type secondary battery, comprising:
    a first connection unit capable of being electrically connected to a terminal of a first polarity electrode of a cable-type secondary battery;
    a second connection unit capable of being electrically connected to a terminal of a second polarity electrode of another cable-type secondary battery; and
    a body electrically and pivotally connected to the first connection unit and the second connection unit,
    wherein at least one of the first connection unit and the second connection unit rotates about a fixed pivot axis.

2. The coupling socket of a cable-type secondary battery according to claim 1, wherein any one of the first connection unit and the second connection unit further includes a fixing member for fixing a terminal of the first polarity electrode or a terminal of the second polarity electrode correspondingly.

3. The coupling socket of a cable-type secondary battery according to claim 1, wherein the first polarity electrode is any one of a cathode and an anode, and the second polarity electrode is the other of the cathode and the anode.

4. The coupling socket of a cable-type secondary battery according to claim 1,
    wherein the cable-type secondary battery has an elongate electrode assembly which includes a first polarity electrode, a second polarity electrode, and a separator or electrolyte interposed between the first and second polarity electrodes, and
    wherein the first polarity electrode and/or the second polarity electrode is configured by applying electrode active material to the surface of a current collector whose section orthogonal to the length direction has a circular shape, an asymmetric oval shape or a polygonal shape.

5. The coupling socket of a cable-type secondary battery according to claim 1, wherein the cable-type secondary battery includes at least two unit cable-type secondary batteries disposed side by side, and an insulative member having a terminal of the first polarity electrode at one end and a terminal of the second polarity electrode at the other end.

6. A coupling assembly of a cable-type secondary battery, comprising:
- a first socket having a first connection fixing unit electrically connectable to a first polarity terminal of a cable-type secondary battery and a pivotal connection unit pivotably combined with respect to the first connection fixing unit so that the first connection fixing unit rotates on a fixed pivot axis; and
- a second socket electrically connectable to a second polarity terminal of the cable-type secondary battery and electrically connectable to a second pivotal connection unit connected to a first polarity terminal of another cable-type secondary battery.

7. The coupling assembly of a cable-type secondary battery according to claim 6, wherein the first socket further includes a body on which at least one of the first connection fixing unit and the pivotal connection unit is pivotal.

8. The coupling assembly of a cable-type secondary battery according to claim 6, wherein at least one of the pivotal connection unit and the second socket further includes a fixing member for fixing a fixed state between the pivotal connection unit and the second socket.

9. The coupling assembly of a cable-type secondary battery according to claim 6,
wherein the pivotal connection unit of the first socket has a protrusion, and the second socket has an insert portion into which the corresponding protrusion is capable of being inserted.

10. The coupling assembly of a cable-type secondary battery according to claim 6,
wherein the cable-type secondary battery comprises:
- a plurality of unit cable-type secondary batteries are arranged side by side; and
- an insulative member with an insulative film shape is mounted to surround an outer surface of the unit cable-type secondary batteries.

11. The coupling assembly of a cable-type secondary battery according to claim 6,
wherein the first socket and the second socket are coaxial in a first orientation.

12. The coupling socket of a cable-type secondary battery according to claim 1, wherein the first connection unit and the second connection unit are coaxial in a first orientation.

13. The coupling socket of a cable-type secondary battery according to claim 1, wherein the first connection unit is pivotably connected to a first end of the body and the second connection unit is pivotably connected to a second end of the body.

* * * * *